United States Patent
Ciminelli

(10) Patent No.: US 7,693,552 B2
(45) Date of Patent: Apr. 6, 2010

(54) TEXT MESSAGING DEVICE

(75) Inventor: Gabriele Ciminelli, Tokyo (JP)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 12/314,382

(22) Filed: Dec. 9, 2008

(65) Prior Publication Data

US 2009/0099838 A1      Apr. 16, 2009

Related U.S. Application Data

(63) Continuation of application No. 10/875,607, filed on Jun. 25, 2004, now Pat. No. 7,502,632.

(51) Int. Cl.
*H04M 1/00* (2006.01)
(52) U.S. Cl. .................. 455/563; 455/466; 455/566; 455/575.1; 455/90.3; 345/171; 704/8; 704/231
(58) Field of Classification Search ............ 455/563, 455/466, 575.1, 90.3; 704/235, 9, 1, 270
See application file for complete search history.

(56) References Cited

U.S. PATENT DOCUMENTS

| | | | |
|---|---|---|---|
| 4,882,681 A | 11/1989 | Brotz | |
| 5,119,296 A | 6/1992 | Zheng et al. | |
| 5,307,267 A | 4/1994 | Yang | |
| 5,410,306 A | 4/1995 | Ye | |
| 5,903,859 A | 5/1999 | Stone et al. | |
| 5,903,861 A * | 5/1999 | Chan | 704/9 |
| 5,905,964 A | 5/1999 | Sudo | |
| 5,913,185 A | 6/1999 | Martino et al. | |
| 5,920,826 A | 7/1999 | Metso et al. | |
| 5,952,942 A * | 9/1999 | Balakrishnan et al. | 341/20 |
| 5,999,895 A * | 12/1999 | Forest | 704/1 |
| 6,014,615 A * | 1/2000 | Chen | 704/3 |
| 6,094,666 A | 7/2000 | Li | |
| 6,161,116 A | 12/2000 | Saltzman | |
| 6,167,287 A | 12/2000 | Chozui | |
| 6,198,948 B1 | 3/2001 | Sudo et al. | |
| 6,292,768 B1 * | 9/2001 | Chan | 704/1 |
| 6,362,752 B1 | 3/2002 | Guo et al. | |

(Continued)

FOREIGN PATENT DOCUMENTS

JP     2-244376 (A)      9/1990

(Continued)

OTHER PUBLICATIONS

English Translation of the cited sections of prior art references (CN85101047A and CN1042616A), 3 pages.

(Continued)

*Primary Examiner*—Sharad Rampuria
(74) *Attorney, Agent, or Firm*—Squire, Sanders & Dempsey, LLP

(57) ABSTRACT

A hand-held wireless communication device for creating and sending text messages including ideograms, wherein the communication device includes an input interface for a user to make a phonetic input, and a processor for controlling a display device to display thereon one or more ideogrammatic representations of the phonetic input according to a first language, which are each selectable by the user for incorporation into a text message according to further information relating thereto in a second language.

22 Claims, 3 Drawing Sheets

U.S. PATENT DOCUMENTS

| | | |
|---|---|---|
| 6,473,621 B1 | 10/2002 | Heie |
| 6,487,424 B1 | 11/2002 | Kraft et al. |
| 6,771,982 B1 | 8/2004 | Toupin |
| 6,788,962 B2 | 9/2004 | Cha |
| 6,810,272 B2 | 10/2004 | Kraft et al. |
| 6,848,080 B1 * | 1/2005 | Lee et al. .................... 715/203 |
| 6,973,332 B2 | 12/2005 | Mirkin et al. |
| 7,047,047 B2 | 5/2006 | Acero et al. |
| 7,162,412 B2 | 1/2007 | Yamada et al. |
| 7,197,331 B2 | 3/2007 | Anastasakos et al. |
| 7,395,203 B2 * | 7/2008 | Wu et al. .................... 704/235 |
| 7,584,188 B2 * | 9/2009 | Scriffignano et al. ........... 707/6 |
| 7,599,830 B2 * | 10/2009 | Babu ............................. 704/9 |
| 2002/0077143 A1 | 6/2002 | Sharif et al. |
| 2003/0236658 A1 | 12/2003 | Yam |
| 2004/0210438 A1 | 10/2004 | Gillick et al. |

FOREIGN PATENT DOCUMENTS

| | | |
|---|---|---|
| JP | 2000-331014 (A) | 11/2000 |

OTHER PUBLICATIONS

English Translation of the Chinese Office Action dated Jun. 8, 2007, 5 pages.

Hiroko Murakami, "New Function Guide for Microsoft Office 2000," 1st Edition, NEC Media Product, Ltd., Oct. 17, 1999, pp. 184, a total of two pages including English Translation.

English Translation of the Japanese Office Action dated May 23, 2007, 4 pages.

Mika Inouke, "First Step Guide of CLIE, from Basic Operation to Communication Setting for NX Series," Feb. 24, 2003, vol. 3, No. 1, pp. 44-51, Mobile Press, Technical Review Co.

Yukari Kitayuguchi, "Learning and Using English by Personal Computer," Nikkei PC Beginners, Nikkei BP Co., Jun. 13, 2003, vol. 8, No. 12, pp. 42-47.

* cited by examiner

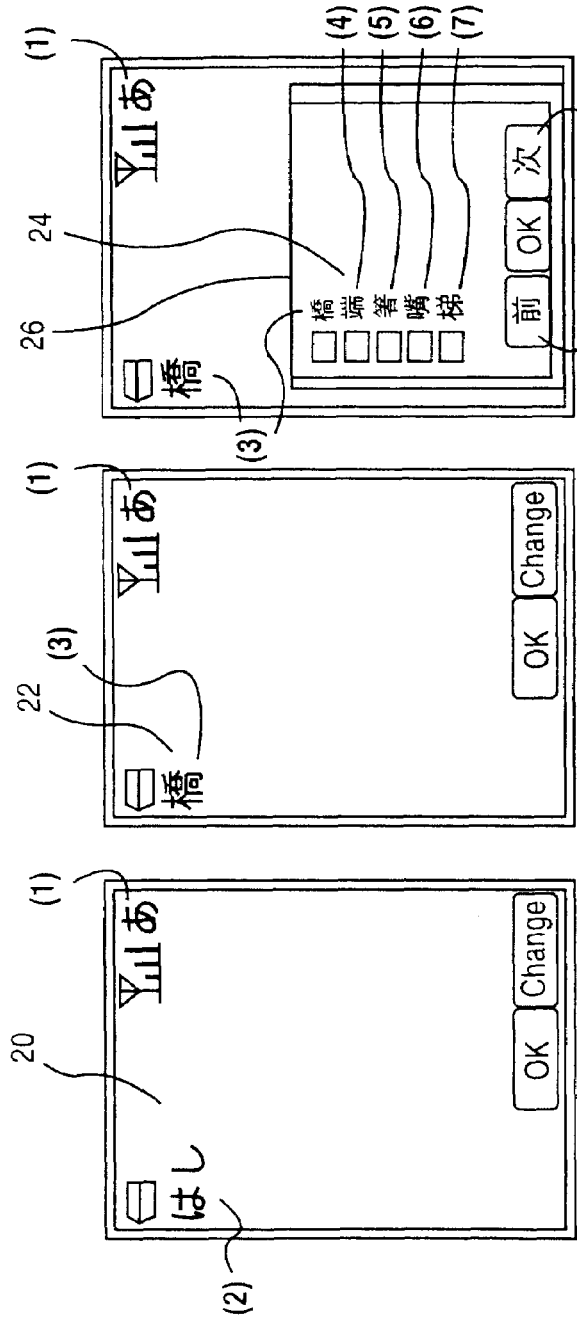

Fig. 1  Fig. 2  Fig. 3

LEGEND:
(1) あ - Japanese "hiragana" phonetic symbol for sound "a"
(2) はし - Japanese "hiragana" phonetic symbols for sound "ha-shi"
(3) 橋 - Japanese "kanji" character for bridge
(4) 端 - Japanese "kanji" character for edge
(5) 箸 - Japanese "kanji" character for chopsticks
(6) 嘴 - Japanese "kanji" character for beak
(7) 梯 - Half of Japanese "kanji" character for combination ladder
(8) 前 - Japanese "kanji" character for before
(9) 次 - Japanese "kanji" character for next

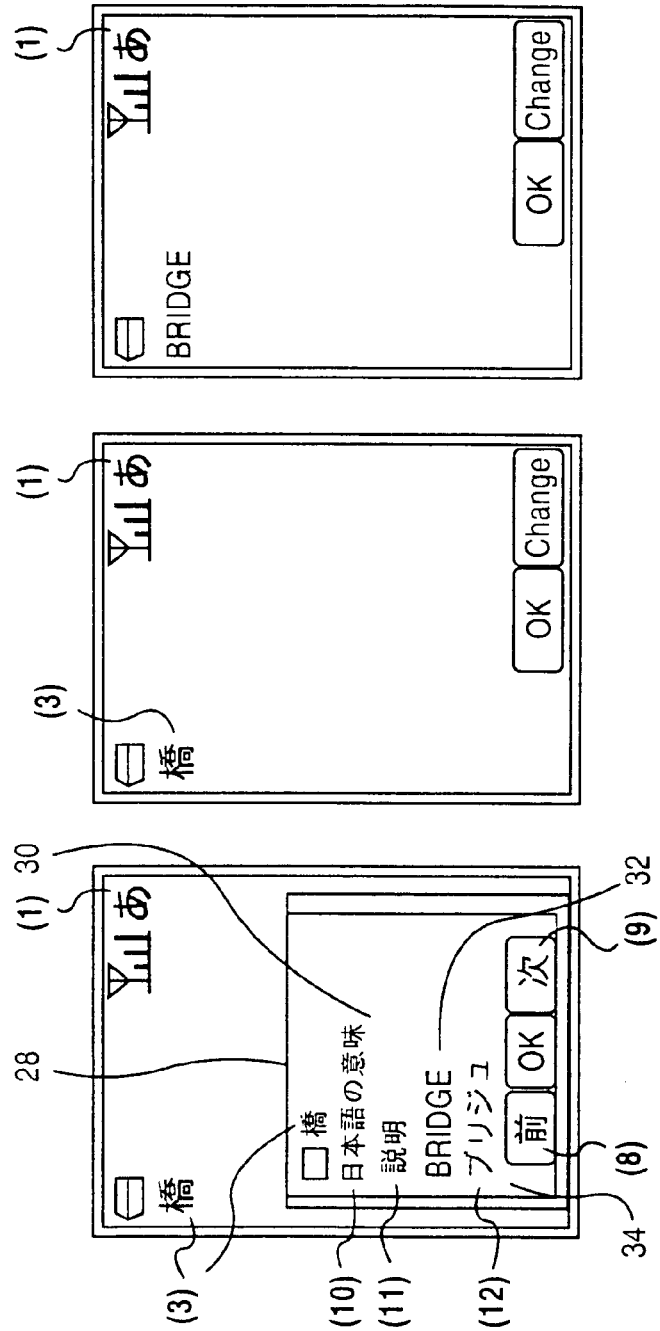

TEXT MESSAGING DEVICE

CROSS REFERENCE TO RELATED APPLICATIONS

This application is a continuation of U.S. patent application Ser. No. 10/875,607, filed on Jun. 25, 2004. The subject matter of the earlier filed application is hereby incorporated by reference.

BACKGROUND

1. Field

The invention relates to hand-held wireless communication devices with which text messages can be created and sent.

2. Description of the Related Art

The creation of text messages via the keypad of a hand-held wireless telephone in many European languages is relatively simple since all 26 letters of the Roman alphabet can be represented on the keys of a standard phone keypad. However, some languages such as Chinese and Japanese use thousands of ideograms, some of which have the same readings as others. A common way of creating text messages including such ideograms is to make a phonetic input using a conventional keypad and then commanding a processor to list one or more ideogrammatic representations corresponding to such phonetic input. The user then selects the desired ideogrammatic representation for incorporation into the text message.

SUMMARY

It is an aim of the certain embodiments of the invention to expand the functionality and/or utility of such hand-held text messaging devices.

According to an embodiment of the invention, there is provided an apparatus. The apparatus includes a processor configured to control a display device to display thereon one or more ideogrammatic representations of a phonetic input according to a language. The processor is further configured to provide further information in the language according to which the ideogrammatic representations are each selectable by a user for incorporation into a text message. The further information includes information other than an indication of the phonetic input.

According to another embodiment of the invention, there is provided a method. The method includes controlling a display device with a processor to display thereon one or more ideogrammatic representations of a phonetic input according to a language. The method further includes providing further information in the language according to which the ideogrammatic representations are each selectable by a user for incorporation into a text message. The further information includes information other than an indication of the phonetic input.

According to another embodiment of the invention, there is provided an apparatus. The apparatus includes processor means for controlling a display device to display thereon one or more ideogrammatic representations of a phonetic input according to a language, and for providing further information in a first language according to which the one or more ideogrammatic representations are each selectable by a user for incorporation into a text message. The further information comprises information other than an indication of the phonetic input.

According to another embodiment of the invention, there is provided an apparatus. The apparatus includes a processor configured to enable a user to make a phonetic input, and to display one or more ideogrammatic representations of the phonetic input according to a first language. The processor is further configured to provide further information in the first language. The further information includes information other than an indication of the phonetic input, The processor is further configured to enable the user to select according to the further information and for incorporation into a text message one of the one or more ideogrammatic representations of the phonetic input.

BRIEF DESCRIPTION OF THE DRAWINGS

An embodiment of the invention shall now be described, by way of example only, with reference to the accompanying drawings, in which:

FIGS. 1 to 6 are display images explaining the operation of a device according to an embodiment of the invention;

DETAILED DESCRIPTION OF THE PREFERRED EMBODIMENTS

By way of example, a hand-held wireless communication device (mobile telephone) according to an embodiment of the invention will be described for the case where the first language is Japanese and the second language is English. As mentioned above, thousands of ideograms known as "kanji" are used in Japanese.

The phonetic input can, for example, be made via a conventional keypad 2 on the basis of a Romanisation system such as the Hepburn, Kunrei or Nippon systems in the case of Japanese and the pinyin system in the case of Chinese. Typically, the 26 letters of the Latin alphabet would be printed in groups of three and four on the number keys of a conventional keypad, and the desired letters would be input by pressing the respective key one, two, three or four times depending on the position of the desired letter in the respective group. In the case of Japanese, one embodiment of the device would then display the phonetic input as Japanese "hiragana" phonetic symbols.

Figure 7:
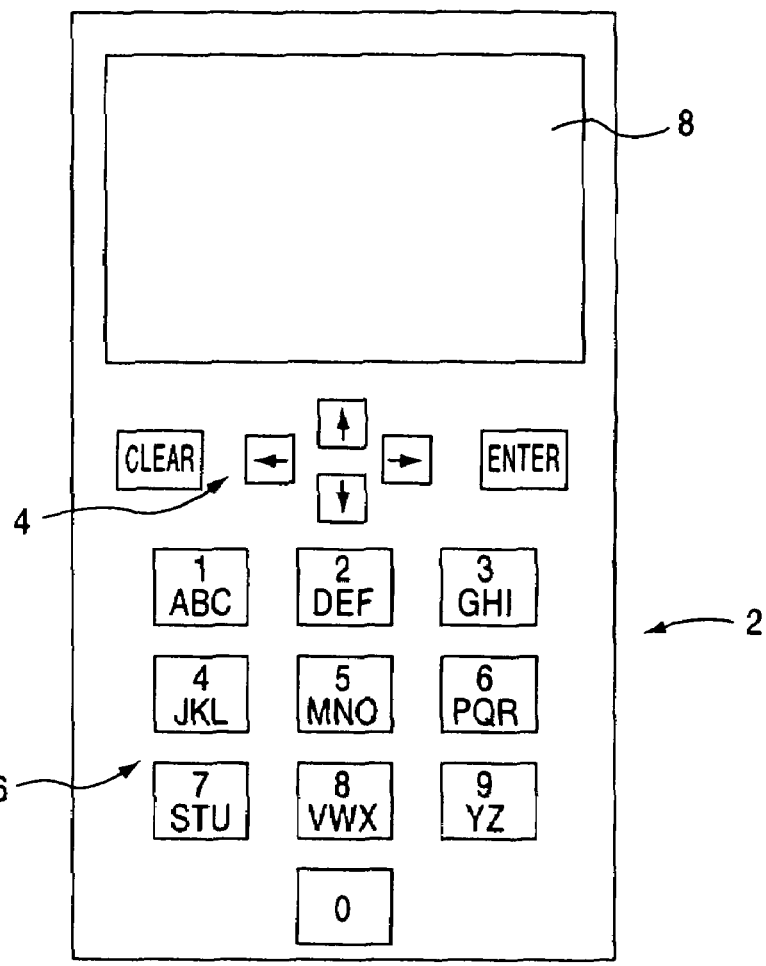
FIG. 7 shows an external view of a device by which the operation explained in FIGS. 1 to 6 can be effected by a user.
Figure 8:
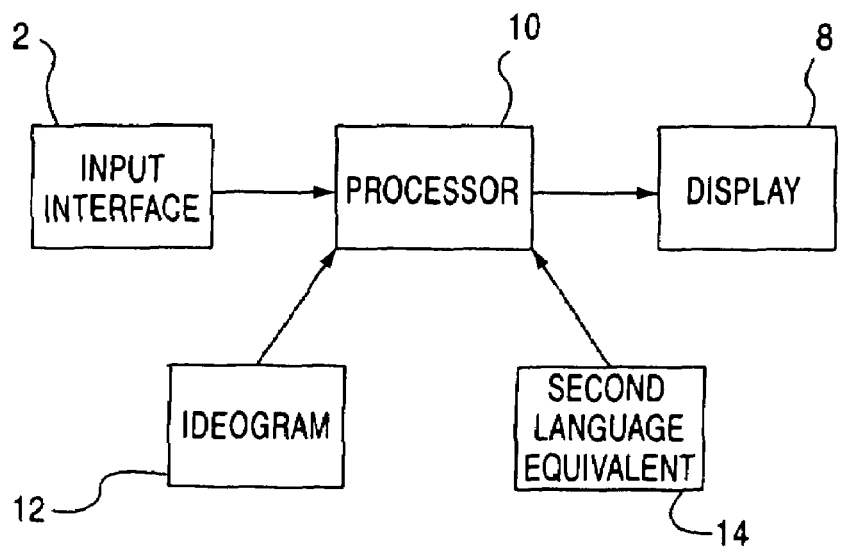
FIG. 8 is a schematic view of the components of a device according to an embodiment of the invention.

As an example, we shall describe the case where a user wishes to include the Japanese "kanji" character meaning bridge (or its English equivalent) into a text message. With reference to FIG. 7, a user makes a phonetic input by pressing in order the "3" key twice for "H", the "1" key once for "A", the "7" key once for "S", the "3" key twice for another "H" and the "3" key three more times for "I". "HASHI" is the phonetic representation of the Japanese word meaning bridge according to the Hepburn system. As shown in FIG. 1, this phonetic input is displayed via the display device 8 (such as a liquid crystal display device) in the Japanese phonetic symbols known as "hiragana" 20. The user could retain these "hiragana" symbols in the text message or, as in this example, can convert them into a symbol or a set of symbols including one or more Japanese "kanji" characters. Pressing the down-arrow key once has the effect of instructing the device processor 10 to locate from a data storage device 12 and display a symbol or set of symbols including one or more "kanji" characters corresponding to the phonetic input (FIG. 2). This option is indicated by the down-arrow sign shown in the navigation indicator at the top right of the display. The symbol or set of symbols displayed by thus pressing the down-key once is known as the "default" and is typically the most common symbol or set of symbols corresponding to the phonetic input. In this example, it is the single "kanji" character meaning "bridge" in Japanese that is displayed 22.

However, the "default" may not always be the symbol or set of symbols that the user wishes to incorporate into the text message. Pressing the down-arrow key on the key-pad a second time (as indicated by the down-arrow sign in the navigation indicator in FIG. 2) has the effect of instructing the processor 10 to locate from data storage device 12 and display (FIG. 3) in a pop-up window 26, a list 24 of alternative symbols or sets of symbols including "kanji" characters that correspond to the phonetic input. The user can then select a specific member of the list by pressing once the number key corresponding to the number shown at the left thereof or can scroll up and down the list using the up and down arrow keys (as suggested by the up and down arrows keys in the navigation indicator). When a member of the list is thus selected, pressing the right-arrow key shown in the navigation indicator in FIG. 3 has the effect of instructing the processor to locate from a data storage device 14 and display (FIG. 4) in another pop-up window 28 (i) an explanation 30 of the "kanji" character or combination in Japanese, (ii) the English equivalent 32, and (iii) an indication 34 of the pronunciation of the English equivalent in Japanese phonetic symbols such as "katakana". As shown in FIG. 4, the English equivalent is highlighted indicating that it is selectable for insertion into the text message (as shown in FIG. 6) by, for example, pressing the "enter" key on the keypad. As shown in FIG. 4, the pop-up window displaying the further information regarding the selected "kanji" character or combination is accompanied by the display of a back-arrow sign at the navigation indicator indicating that the user can return to the list of "kanji" characters or combinations shown in FIG. 3 by pressing the back-arrow key. The user would use this option where, for example, it is clear from the further information that he or she has selected the wrong "kanji" character or combination. Alternatively, this can be done by pressing the "clear" key. When the user has identified the desired "kanji" character or combination, the user can select it for insertion into the text message as shown in FIG. 5 and can continue with the creation of the text message by making another phonetic input.

Where the pop-up window shown in FIG. 4 is not large enough to display simultaneously all the available further information and the user needs to scroll down in order to access it all, an appropriate indication to this effect is preferably displayed, such as a down-arrow at the navigation indicator.

In the example given above, the ideogrammatic representations shown are all single "kanji" characters. However, for some phonetic inputs, the corresponding ideogrammatic representations may include combinations of "kanji" characters, and/or combinations of "kanji" characters and phonetic symbols such as "hiragana".

The above-described device has the following advantages. (1) It facilitates the identification of difficult "kanji" characters, and also facilitates the learning of new "kanji" characters by, for example, Japanese school students or foreign students of Japanese. (2) It facilitates the learning of the English language by Japanese users; (3) it facilitates the creation of mixed language text messages; and (4) it facilitates the learning of the pronunciation of English words by Japanese users.

The above-described device thus offers language flexibility and multi-language features which can be very useful not only for Japanese, but also for other languages that use ideograms such as Chinese. For the Chinese language, the phonetic input can be made according to the pinyin system which also uses the Roman alphabet.

In the example given above, the desired ideogrammatic representation is selectable according to an English language equivalent thereof. In an alternative embodiment, the further information in the English language is simply of a level sufficient to differentiate the respective ideogrammatic representation from any others presented for the same phonetic input. For example, the further information could simply be an indication of the general meaning of one or more kanji characters or combinations of kanji characters included in the respective ideogrammatic representation.

Thus, certain embodiments of the invention may include any feature or combination of features disclosed herein either implicitly or explicitly or any generalization thereof, without limitation to the scope of any definitions set out above. In view of the foregoing description it will be evident to a person skilled in the art that various modifications may be made within the scope of the invention.

What is claimed is:

1. An apparatus, comprising:
 a processor configured to control a display device to display thereon one or more ideogrammatic representations of a phonetic input according to a language, and configured to provide further information in the language according to which the ideogrammatic representations are each selectable by a user for incorporation into a text message,
 wherein the further information comprises information other than an indication of the phonetic input.

2. The apparatus of claim 1, wherein the further information further comprises an explanation of a meaning of a respective ideogrammatic representation in the language.

3. The apparatus of claim 1, wherein the processor is further configured to first display the one or more ideogrammatic representations without the further information, and wherein one or more of the displayed ideogrammatic representations are selectable via an input interface to access the further information relating thereto.

4. The apparatus of claim 1, wherein the processor is further configured to control the display device to first display a single ideogrammatic representation corresponding to the phonetic input together with, when applicable, an indication that a list of other such ideogrammatic representations is also accessible for viewing by operating an input interface.

5. The apparatus of claim 3, wherein the processor is further configured to control the display device to provide an indication that the further information relating to each of the displayed ideogrammatic representations is accessible for viewing by the user by operating an input interface.

6. The apparatus of claim 5, wherein the input interface comprises an array of keys that are operable by a user, and wherein the indication comprises a representation of a selected one of the array of keys whose operation provides access to the further information.

7. The apparatus of claim 1, further comprising:
 an input interface comprising an array of keys operable by a user.

8. The apparatus of claim 7, wherein the phonetic input is made by operating one or a combination of the array of keys.

9. The apparatus of claim 1, wherein the further information is displayable via the display device.

10. The apparatus of claim 1, wherein the language is Japanese or Chinese and the phonetic input is made at least partly according to a Romanization system.

11. A method, comprising:
 controlling a display device with a processor to display thereon one or more ideogrammatic representations of a phonetic input according to a language; and providing further information in the language according to which the ideogrammatic representations are each selectable by a user for incorporation into a text message,
wherein the further information comprises information other than an indication of the phonetic input.

12. The method of claim 11, wherein the providing comprises providing the further information comprising an explanation of a meaning of a respective ideogrammatic representation in the language.

13. The method of claim 11, further comprising:
displaying the one or more ideogrammatic representations without the further information,
wherein one or more of the displayed ideogrammatic representations are selectable via an input interface to access the further information relating thereto.

14. The method of claim 11, further comprising:
controlling the display device to first display a single ideogrammatic representation corresponding to the phonetic input together with, when applicable, an indication that a list of other such ideogrammatic representations is also accessible for viewing by operating an input interface.

15. The method of claim 13, further comprising:
controlling the display device to provide an indication that the further information relating to each of the displayed ideogrammatic representations is accessible for viewing by the user by operating an input interface.

16. The method of claim 15, wherein the receiving comprises receiving the phonetic input on the input interface comprising an array of keys that are operable by a user, and wherein the indication comprises a representation of a selected one of the array of keys whose operation provides access to the further information.

17. The method of claim 11, wherein the receiving comprises receiving the phonetic input on an input interface comprising an array of keys operable by a user.

18. The method of claim 17, further comprising:
operating one or a combination of the array of keys to make the phonetic input.

19. The method of claim 11, further comprising:
displaying the further information on the display device.

20. The method of claim 11, wherein the controlling comprises controlling the display device to display thereon the one or more ideogrammatic representations of the phonetic input according to the language comprising Japanese or Chinese, and wherein the phonetic input is made at least partly according to a Romanization system.

21. An apparatus, comprising:
processor means for controlling a display device to display thereon one or more ideogrammatic representations of a phonetic input according to a language; and
selecting means for providing further information in a first language according to which the one or more ideogrammatic representations are each selectable by a user for incorporation into a text message,
wherein the further information comprises information other than an indication of the phonetic input.

22. An apparatus, comprising:
a processor configured to
enable a user to make a phonetic input;
display one or more ideogrammatic representations of the phonetic input according to a first language;
provide further information in the first language, wherein the further information comprises information other than an indication of the phonetic input; and
enable the user to select according to the further information and for incorporation into a text message one of the one or more ideogrammatic representations of the phonetic input.

* * * * *